(12) United States Patent
Sendo et al.

(10) Patent No.: US 12,472,455 B2
(45) Date of Patent: Nov. 18, 2025

(54) HONEYCOMB FILTER (71) Applicant: NGK Insulators, Ltd., Nagoya (JP)

(72) Inventors: Koichi Sendo, Nagoya (JP); Yu Torii, Nagoya (JP); Shuji Ueda, Nagoya (JP); Shungo Nagai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 380 days.

(21) Appl. No.: 17/148,896

(22) Filed: Jan. 14, 2021

(65) Prior Publication Data

US 2021/0268422 A1 Sep. 2, 2021

(30) Foreign Application Priority Data

Mar. 2, 2020 (JP) ................. 2020-034885

(51) Int. Cl.
*B01D 46/24* (2006.01)

(52) U.S. Cl.
CPC ... *B01D 46/2429* (2013.01); *B01D 46/24491* (2021.08); *B01D 46/24492* (2021.08);
(Continued)

(58) Field of Classification Search
CPC .............. B01D 46/244; B01D 46/2429; B01D 46/2459; B01D 46/24491; B01D 46/2496;
(Continued)

(56) References Cited

U.S. PATENT DOCUMENTS

2003/0137071 A1 7/2003 Noguchi et al.
2004/0051196 A1 3/2004 Otsuka et al.
(Continued)

FOREIGN PATENT DOCUMENTS

JP 2002-326879 A1 11/2002
JP 2003-238271 A1 8/2003
(Continued)

OTHER PUBLICATIONS

Japanese Office Action (with English translation), Japanese Application No. 2020-034885, dated Aug. 23, 2022 (12 pages).
(Continued)

*Primary Examiner* — Jennifer Dieterle
(74) *Attorney, Agent, or Firm* — BURR PATENT LAW, PLLC (57) ABSTRACT

A honeycomb filter includes a pillar-shaped honeycomb structure body having a porous partition wall disposed, surrounding a plurality of cells which serve as fluid through channels extending from a first end face to a second end face; and a plugging portion provided at an open end on the first end face side or the second end face side of each of the cells, wherein the partition wall is composed of a material containing cordierite as a main component thereof, an average pore diameter of the partition wall is 20 to 30 µm, an average equivalent circle diameter of pores existing at a surface of the partition wall and having equivalent circle diameters exceeding 3.0 µm is 18 to 30 µm, and a number per unit area of pores existing at a surface of the partition wall and having equivalent circle diameters exceeding 3.0 µm is 400 per $mm^2$ or more.

5 Claims, 3 Drawing Sheets (52) U.S. Cl.
CPC ..... *B01D 46/2474* (2013.01); *B01D 46/2476* (2021.08); *B01D 46/2482* (2021.08)

(58) Field of Classification Search
CPC ........ B01D 2201/62; B01D 2255/9205; F01N 3/0222; B01J 35/04; C04B 38/0009
USPC ............................................ 55/523; 428/116
See application file for complete search history.

(56) References Cited

U.S. PATENT DOCUMENTS

| | | |
|---|---|---|
| 2012/0317947 A1 | 12/2012 | Okazaki |
| 2016/0250577 A1 | 9/2016 | Okazaki |
| 2018/0050333 A1* | 2/2018 | Okazaki .................. C04B 38/00 |
| 2019/0201884 A1 | 7/2019 | Tanaka et al. |

FOREIGN PATENT DOCUMENTS

| | | | |
|---|---|---|---|
| JP | 2004-360654 A | 12/2004 | |
| JP | 2019-118857 A | 7/2019 | |
| WO | 2011/102487 A1 | 8/2011 | |
| WO | 2015/046242 A1 | 4/2015 | |

OTHER PUBLICATIONS

German Office Action (with English translation) dated Nov. 11, 2024 (Application No. 10 2021 000 167.2).

* cited by examiner

HONEYCOMB FILTER

The present application is an application based on JP 2020-034885 filed on Mar. 2, 2020 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter used with a catalyst for purifying exhaust gas loaded therein, thereby enabling effective improvement of filtration efficiency and suppression of an increase in pressure loss.

Description of the Related Art

Hitherto, as a filter adapted to trap particulate matter in an exhaust gas emitted from an internal combustion engine, such as an automobile engine, there has been known a honeycomb filter that uses a honeycomb structure. The honeycomb structure has a porous partition wall composed of cordierite or the like, and a plurality of cells are defined by the partition wall. In the honeycomb filter, the foregoing honeycomb structure is provided with, for example, plugging portions that alternately plug the open ends on the inflow end face side of the plurality of cells and the open ends on the outflow end face side thereof. In the honeycomb filter, the porous partition wall functions as a filter that traps the particulate matter in an exhaust gas.

The honeycomb structure can be manufactured by adding a pore former, a binder and the like to a ceramic raw material powder to prepare a plastic kneaded material, forming the obtained kneaded material into a predetermined shape to obtain a formed body, and firing the obtained formed body (refer to, for example, Patent Documents 1 and 2). As a ceramic raw material powder, a cordierite forming raw material or the like is known.

[Patent Document 1] JP-A-2002-326879
[Patent Document 2] JP-A-2003-238271

According to the conventional manufacturing methods of a honeycomb filter, a method has been tried, in which, at the time of manufacturing a honeycomb structure, the particle size of a cordierite forming raw material is not controlled, and hollow resin particles of a foamable resin or the like, or water-swellable particles of crosslinked starch or the like are used for pore formers. However, it has been impossible to manufacture honeycomb filters that satisfy current exhaust gas regulations by such a conventional manufacturing method.

SUMMARY OF THE INVENTION

The present invention has been made in view of the problems with the prior arts described above. The present invention provides a honeycomb filter used with a catalyst for purifying exhaust gas loaded therein, thereby enabling effective improvement of filtration efficiency and suppression of an increase in pressure loss.

According to the present invention, a honeycomb filter described below is provided.

According to a first aspect of the present invention, a honeycomb filter is provided including:
a pillar-shaped honeycomb structure body having a porous partition wall disposed, surrounding a plurality of cells which serve as fluid through channels extending from a first end face to a second end face; and
a plugging portion provided at an open end on the first end face side or the second end face side of each of the cells,
wherein the partition wall is composed of a material containing cordierite as a main component thereof,
an average pore diameter of the partition wall is 20 to 30 µm,
an average equivalent circle diameter of pores which exist at a surface of the partition wall and which have equivalent circle diameters exceeding 3.0 µm is 18 to 30 µm, and
a number per unit area of pores which exist at a surface of the partition wall and which have equivalent circle diameters exceeding 3.0 µm is 400 per $mm^2$ or more.

According to a second aspect of the present invention, the honeycomb filter described in the foregoing first aspect is provided, wherein a porosity of the partition wall is 60 to 70%.

According to a third aspect of the present invention, the honeycomb filter described in the foregoing first or second aspects is provided, wherein a thickness of the partition wall is 152 to 305 µm.)

According to a fourth aspect of the present invention, the honeycomb filter described in any one of the foregoing first to third aspects is provided, wherein the partition wall is loaded with a catalyst for purifying exhaust gas.

The honeycomb filter in accordance with the present invention provides an effect of enabling effective improvement of filtration efficiency and suppression of an increase in pressure loss by being used with a catalyst for purifying exhaust gas loaded therein. More specifically, the honeycomb filter in accordance with the present invention enables the coatability of a catalyst to be enhanced or improved in the loading of a catalyst for purifying exhaust gas. Consequently, by loading the honeycomb filter with the catalyst for purifying exhaust gas, the filtration efficiency can be effectively improved and an increase in pressure loss can be effectively suppressed.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

(1) Honeycomb Filter

Figure 1:
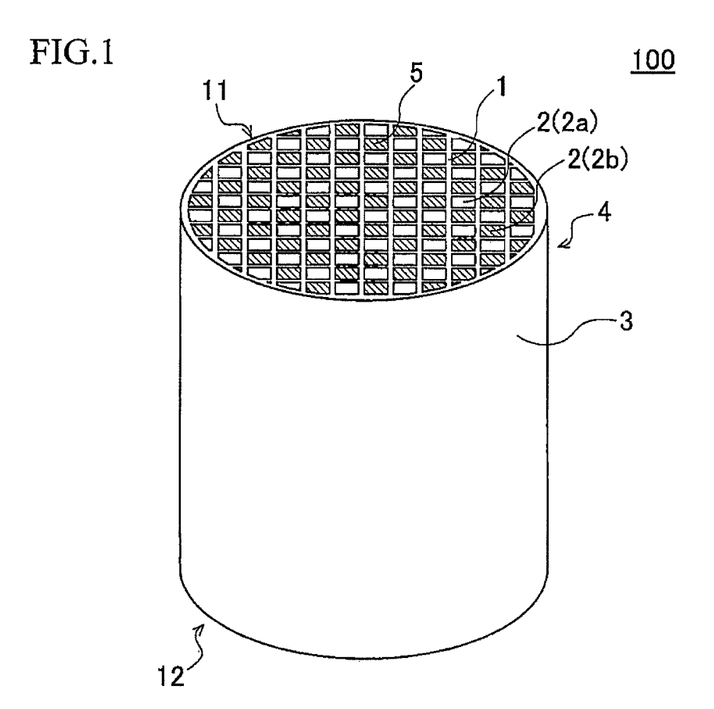
FIG. 1 is a perspective view schematically showing an embodiment of a honeycomb filter in accordance with the present invention viewed from an inflow end face side.
Figure 2:
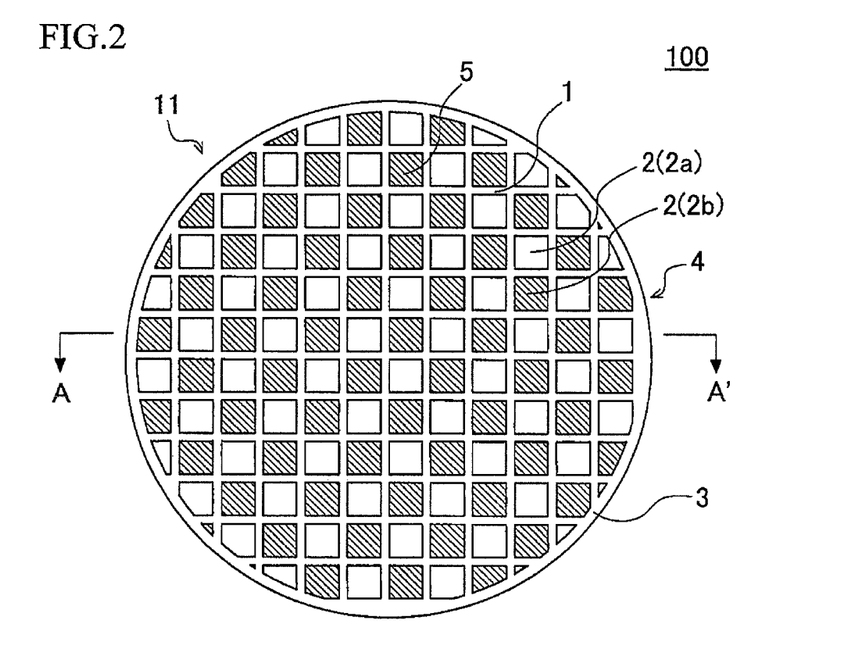
FIG. 2 is a plan view of the honeycomb filter shown in FIG. 1, viewed from the inflow end face side.
Figure 3:
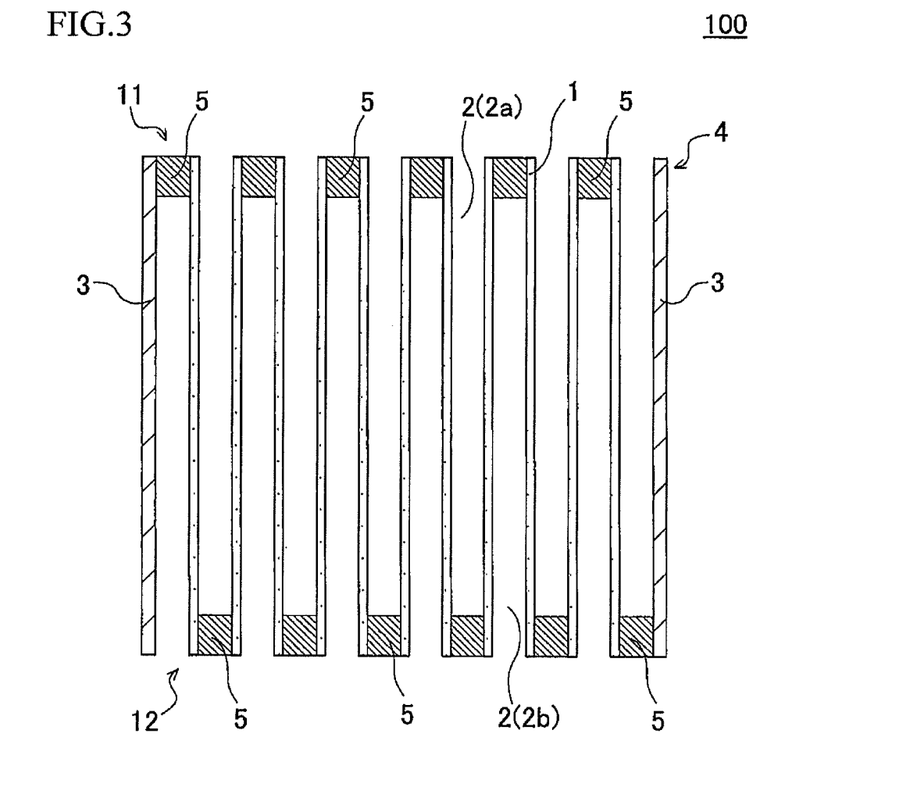
FIG. 3 is a sectional view schematically showing a section A-A' of FIG. 2.

As shown in FIG. 1 to FIG. 3, a first embodiment of the honeycomb filter in accordance with the present invention is a honeycomb filter 100 that includes a honeycomb structure body 4 and plugging portions 5. The honeycomb structure body 4 is a pillar-shaped structure having a porous partition wall 1 disposed so as to surround a plurality of cells 2 that serve as fluid through channels extending from a first end face 11 to a second end face 12. In the honeycomb filter 100, the honeycomb structure body 4 is pillar-shaped and further includes an outer circumferential wall 3 on the outer circumferential side face. In other words, the outer circumferential wall 3 is provided to encompass the partition wall 1 provided in a grid pattern. The plugging portions 5 are provided at open ends on the first end face 11 side or the second end face 12 side of each of the cells 2.

FIG. 1 is a perspective view schematically showing an embodiment of the honeycomb filter in accordance with the present invention viewed from an inflow end face side. FIG. 2 is a plan view of the honeycomb filter shown in FIG. 1, viewed from the inflow end face side. FIG. 3 is a sectional view schematically showing a section A-A' of FIG. 2.

In the honeycomb filter 100, the partition wall 1 constituting the honeycomb structure body 4 is configured as described below. First, the partition wall 1 is composed of a material that contains cordierite as the main component thereof. The partition wall 1 is preferably composed of cordierite except for components that are inevitably contained.

In the honeycomb filter 100, the average pore diameter of the partition wall 1 constituting the honeycomb structure body 4 is 20 to 30 µm. The average pore diameter of the partition wall 1 is a value measured by a mercury press-in method. The average pore diameter of the partition wall 1 can be measured using, for example, Autopore IV (trade name) manufactured by Micromeritics. An average pore diameter of the partition wall 1 that is below 20 µm is undesirable, because it would lead to an increase in pressure loss after coating a catalyst. Further, an average pore diameter of the partition wall 1 that exceeds 30 µm is undesirable, because it would deteriorate the filtration efficiency after coating a catalyst. The average pore diameter of the partition wall 1 is 20 to 30 µm, but is preferably, for example, 22 to 28 µm. In the present specification, "coating a catalyst" means to load the honeycomb filter 100 with various types of catalysts for purifying exhaust gas or the like.

Further, in the partition wall 1 constituting the honeycomb structure body 4, the average value of the equivalent circle diameters (µm) of the pores which exist at a surface of the partition wall 1 and which have equivalent circle diameters exceeding 3.0 µm is 18 to 30 µm. Hereinafter, "the average value of the equivalent circle diameters (µm)" will be referred to as "the average equivalent circle diameter (µm)." In addition, "the average equivalent circle diameter (µm) of pores which exist at the surface of the partition wall 1 and which have equivalent circle diameters exceeding 3.0 µm" may be referred to simply as "the average equivalent circle diameter (µm) of pores of the surface of the partition wall 1." An average equivalent circle diameter of the pores of the surface of the partition wall 1 that is below 18 µm is undesirable, because it would increase pressure loss after coating a catalyst. Further, an average equivalent circle diameter of the pores of the surface of the partition wall 1 that exceeds 30 µm is undesirable, because it would deteriorate the filtration efficiency after coating a catalyst. The average equivalent circle diameter of the pores of the surface of the partition wall 1 is 18 to 30 µm, but is preferably, for example, 18 to 28 µm.

In the partition wall 1 constituting the honeycomb structure body 4, the number of pores, which exist at the surface of the partition wall 1 and which have equivalent circle diameters exceeding 3.0 µm, per unit area (specifically, per $mm^2$) is 400 per $mm^2$ or more. Hereinafter, "the number per $mm^2$ of pores, which exist at the surface of the partition wall 1 and which have equivalent circle diameters exceeding 3.0 µm" may be referred to as "the number of pores (pores/$mm^2$)" of the surface of the partition wall 1. If the number of pores of the surface of the partition wall 1 is below 400 per $mm^2$, then it would be difficult to achieve both improvement of filtration efficiency and suppression of an increase in pressure loss when a catalyst for purifying exhaust gas is loaded. There is no particular restriction on an upper limit value of the number of pores of the surface of the partition wall 1, but the number is preferably, for example, 1000 per $mm^2$ or less. Therefore, the number of pores of the surface of the partition wall 1 is preferably 400 to 10000 per $mm^2$ and more preferably 400 to 5000 per $mm^2$.

The average equivalent circle diameter (µm) of pores of the surface of the partition wall 1 and the number of pores (pores/$mm^2$) of the surface of the partition wall 1 can be measured by the following method. First, a sample for measurement is cut out from the honeycomb structure body 4 so as to make it possible to observe the surface of the partition wall 1 of the honeycomb structure body 4. Then, the surface of the partition wall 1 of the sample for measurement is photographed by a laser microscope. The laser microscope that can be used is, for example, a shape analysis laser microscope of "VK X250/260 (trade name)" manufactured by KEYENCE Corporation. In photographing the surface of the partition wall 1, the magnification is set to 240 times, and arbitrary places of 10 fields of view are photographed. Image processing of the captured images is performed, and the number of pores of the surface of the partition wall 1 is calculated. In the image processing, an area is selected such that no portion of the partition wall 1 except the surface of the partition wall 1 is included in the area to be subjected to the image processing, and the inclination of the surface of the partition wall 1 is corrected to be horizontal. Thereafter, the upper limit of the height for recognizing pores is changed to −3.0 µm from a reference surface. Under a condition that pores having equivalent circle diameters of 3.0 µm or less are ignored, the number of pores of the captured image is calculated using image processing software. The equivalent circle diameter (µm) of the pores of the surface of the partition wall 1 can be calculated by measuring an opening area S of each pore and applying an equation of the equivalent circle diameter=$\sqrt{\{4\times (area\ S)/\pi\}}$ with respect to the area S that has been measured. The value of the number of pores per $mm^2$ of the surface of the partition wall 1 is to be an average value of the measurement results of the 10 fields of view. The image processing software used can be, for example, "VK-X (trade name)" included with the shape analysis laser microscope of "VK X250/260 (trade name)" manufactured by KEYENCE Corporation. Further, the average equivalent circle diameter (µm) of the pores of the surface of the partition wall 1 can be determined as described below. First, in the captured image that has been subjected to the image processing, the equivalent circle diameter (µm) of each pore is calculated from the opening area S of each pore of the surface of the partition wall 1 as described above. Then, for the pores having equivalent circle diameters exceeding 3.0 µm, the arithmetic mean value of the equivalent circle diameters (µm) is calculated, and the calculated value is used as the average equivalent circle diameter (µm) of the pores of the surface of the partition wall 1. The measurement of the equivalent circle diameter of each pore and the image analysis ignoring pores that have predetermined equivalent circle diameters can be performed using the image processing software described above.

In the honeycomb filter 100, the thickness of the partition wall 1 is preferably 152 to 305 µm, and more preferably 203 to 254 µm. A thickness of the partition wall 1 that is below 152 µm is not desirable in respect of strength. A thickness of the partition wall 1 that exceeds 305 µm is not desirable in respect of pressure loss.

The cell density of the honeycomb structure body 4 is preferably, for example, 23 to 62 cells/cm$^2$, and more preferably 27 to 47 cells/cm$^2$.

The porosity of the partition wall 1 of the honeycomb structure body 4 is preferably, for example, 50 to 70%, more preferably 55 to 70%, and particularly preferably 60 to 70%. The porosity of the partition wall 1 is indicated by a value measured by the mercury intrusion method, and can be measured using, for example, Autopore IV (trade name) manufactured by Micromeritics. To measure the porosity, a part of the partition wall 1 is cut out from the honeycomb filter 100 as a test piece, and the obtained test piece can be used for the measurement.

There is no particular restriction on the shapes of the cells 2 formed in the honeycomb structure body 4. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and some other cells may be relatively smaller. In the present invention, the term "cells 2" means the spaces surrounded by the partition wall 1.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall 1 after the partition wall and the circumferential wall are integrally formed and then the formed circumferential wall is removed by a publicly known method, such as grinding, in a manufacturing process.

There is no particular restriction on the shape of the honeycomb structure body 4. The honeycomb structure body 4 may be pillar-shaped, the shapes of the first end face 11 (e.g., the inflow end face) and the second end face 12 (e.g., the outflow end face) being circular, elliptical, polygonal or the like.

There is no particular restriction on the size of the honeycomb structure body 4, e.g. the length from the first end face 11 to the second end face 12, and the size of the section that is orthogonal to the extending direction of the cells 2 of the honeycomb structure body 4. Each size may be selected as appropriate such that optimum purification performance is obtained when the honeycomb filter 100 is used as a filter for purifying exhaust gas.

In the honeycomb filter 100, the plugging portions 5 are provided at the open ends on the first end face 11 side of predetermined cells 2 and at the open ends on the second end face 12 side of the remaining cells 2. If the first end face 11 is defined as the inflow end face, and the second end face 12 is defined as the outflow end face, then the cells 2 which have the plugging portions 5 placed at the open ends on the outflow end face side and which have the inflow end face side open are defined as inflow cells 2a. Further, the cells 2 which have the plugging portions 5 placed at the open ends on the inflow end face side and which have the outflow end face side open are defined as outflow cells 2b. The inflow cells 2a and the outflow cells 2b are preferably arranged alternately with the partition wall 1 therebetween. This, in addition, preferably forms a checkerboard pattern by the plugging portions 5 and "the open ends of the cells 2" on both end faces of the honeycomb filter 100.

The material of the plugging portions 5 is preferably a material that is preferred as the material of the partition wall 1. The material of the plugging portions 5 and the material of the partition wall 1 may be the same or different.

The honeycomb filter 100 preferably has the partition wall 1, which defines the plurality of cells 2, loaded with a catalyst for purifying exhaust gas. Loading the partition wall 1 with a catalyst refers to coating the catalyst onto the surface of the partition wall 1 and the inner walls of the pores formed in the partition wall 1. This configuration makes it possible to turn CO, NOx, HC and the like in exhaust gas into harmless substances by catalytic reaction. In addition, the oxidation of PM of trapped soot or the like can be accelerated. The honeycomb filter 100 of the present embodiment can enhance and improve the coatability of a catalyst in the loading of a catalyst for purifying exhaust gas. Consequently, the filtration efficiency can be effectively enhanced and an increase in pressure loss can be effectively suppressed by the loading of a catalyst for purifying exhaust gas.

There is no particular restriction on the catalyst with which the partition wall 1 is loaded. For example, such a catalyst can be a catalyst which contains a platinum group element and which contains an oxide of an element of at least one of aluminum, zirconium, and cerium. The loading amount of the catalyst is preferably 100 to 150 g/L, and more preferably 100 to 130 g/L. In the present specification, the loading amount of a catalyst (g/L) indicates the amount (g) of catalyst loaded per unit volume (L) of the honeycomb filter.

(2) Manufacturing Method of the Honeycomb Filter

There is no particular restriction on the manufacturing method of the honeycomb filter of the present embodiment, and the manufacturing method can be one that includes, for example, a kneaded material preparation process, a forming process, and a firing process, as described below.

The kneaded material preparation process is a process for preparing a plastic kneaded material by adding an organic pore former and a dispersing medium to a cordierite forming raw material. The forming process is a process for forming the kneaded material, which has been obtained by the kneaded material preparation process, into a honeycomb shape to make a honeycomb formed body. The firing process is a process for firing the honeycomb formed body, which has been obtained by the forming process, to obtain a honeycomb filter. The following will describe in more detail each process in the manufacturing method of the honeycomb filter.

(2-1) Kneaded Material Preparation Process

In the kneaded material preparation process, first, the cordierite forming raw material, the organic pore former, and the dispersing medium, which are the raw materials of the kneaded material, are prepared. The "cordierite forming raw material" is a ceramic raw material blended so as to have a chemical composition in which silica is in the range of 42 to 56% by mass, alumina is in the range of 30 to 45% by mass, and magnesia is in the range of 12 to 16% by mass, and the ceramic raw material is fired to become cordierite.

In the kneaded material preparation process, a cordierite forming raw material that contains at least one of porous silica and fused silica is preferably used. The porous silica and the fused silica are a silicon source of a silica composition in the cordierite forming raw material, and function also as an inorganic pore former. The porous silica preferably has a BET specific surface area of 100 to 500 $m^2/g$, and more preferably 200 to 400 $m^2/g$, as measured according to, for example, JIS-R1626.

For the cordierite forming raw material, in addition to at least one of the foregoing porous silica and fused silica, a plurality of types of raw materials that become a magnesium source, a silicon source, and an aluminum source can be mixed and used so as to have a chemical composition of cordierite. Examples of the cordierite forming raw material include talc, kaolin, alumina, aluminum hydroxide, boehmite, crystalline silica, and dickite.

In the kneaded material preparation process, a cordierite forming raw material having the particle size thereof adjusted as described below is used. In the cumulative particle size distribution of the cordierite forming raw material based on volume, a particle diameter of 10% by volume of the total volume from a small diameter side is denoted by $D_{(a)}$ 10, a particle diameter of 50% by volume of the total volume from a small diameter side is denoted by $D_{(a)}$ 50, and a particle diameter of 90% by volume of the total volume from a small diameter side is denoted by $D_{(a)}$ 90. The unit of each of $D_{(a)}$ 10, $D_{(a)}$ 50, and $D_{(a)}$ 90 is "µm." The cumulative particle size distribution of the cordierite forming raw material is to be based on values measured by a laser diffraction/scattering type particle size distribution measurement method. In the kneaded material preparation step, a cordierite forming raw material that satisfies the relationship of the following expression (1) is preferably used.

$$D_{(a)}50/(D_{(a)}90-D_{(a)}10) \geq 0.30 \qquad \text{Expression (1):}$$

$$|\log_{10}D_{(a)}50 - \log_{10}D_{(b)}50| \leq 0.60 \qquad \text{Expression (2):}$$

Further, in the kneaded material preparation process, an organic pore former having the particle size thereof adjusted as described below is preferably used. In the cumulative particle size distribution of the organic pore former based on volume, a particle diameter of 50% by volume of the total volume from the small diameter side is denoted by $D_{(b)}$ 50. The unit of $D_{(b)}$ 50 is "µm." The cumulative particle size distribution of the organic pore former is also to be based on values measured by the laser diffraction/scattering type particle size distribution measurement method. In the kneaded material preparation step, an organic pore former having $D_{(b)}$ 50 of 40 µm or less is preferably used. Further, in the kneaded material preparation process, a cordierite forming raw material and an organic pore former that satisfy the relationship of the above expression (2) are preferably used. In the expression (2), "$\log_{10} D_{(a)}$ 50" and "$\log_{10} D_{(b)}$ 50" denote logarithms with base 10. The left side of expression (2) indicates an absolute value of a difference between "$\log_{10} D_{(a)}$ 50" and "logic $D_{(b)}$ 50." Hereinafter, unless otherwise specified, the unit of the particle diameters of raw materials used in the kneaded material preparation process will be "µm." Further, in various types of raw materials used as raw materials, when simply referring to "D50," it means a particle diameter (µm) of 50% by volume of a total volume from the small diameter side in the cumulative particle size distribution of the raw material. In other words, "D50" means a median diameter.

The honeycomb filter of the present embodiment can be successfully manufactured by manufacturing the honeycomb filter by using the kneaded material prepared using the cordierite forming raw material and the organic pore former described above.

The organic pore former is a pore former that contains carbon as a raw material, any such pore former may be used insofar as it has a property of being dispersed and lost by firing in the firing process described later. There is no particular restriction on the material of the organic pore former insofar as the particle size thereof satisfies the relationship in the foregoing expression (2), examples including a polymer compound such as a water absorbable polymer, starch, or foamable resin, or polymethyl methacrylate (PMMA), coke and the like. The organic pore formers include not only pore formers made mainly of organic substances but also pore formers such as charcoal, coal, and coke, which are dispersed and lost by firing.

The particle size of the cordierite forming raw material can be determined by individually measuring the cumulative particle size distribution of each raw material used as the cordierite forming raw material, and then weighting and averaging from the blending ratio of each raw material using the measurement result of the cumulative particle size distribution of each raw material. More specifically, if a cordierite forming raw material is composed of talc, kaolin, alumina, aluminum hydroxide, and porous silica, then first, for each raw material, $D_{(a)}$ 10, $D_{(a)}$ 50, and $D_{(a)}$ 90 are measured. Then, $D_{(a)}$ 10, $D_{(a)}$ 50, and $D_{(a)}$ 90 of the cordierite forming raw material can be determined by weighting and averaging from the blending ratio of each raw material. The cumulative particle size distribution of each raw material is to be based on the values measured by the laser diffraction/scattering method. For example, the cumulative particle size distribution of each raw material can be measured using a laser diffraction/scattering type particle diameter distribution measurement device (trade name: LA-960) manufactured by HORIBA, Ltd.

The particle size of an organic pore former can also be measured using the foregoing measurement device. If an organic pore former is composed of one type, then $D_{(b)}$ 50 can be determined from measured cumulative particle size distribution. If an organic pore former is composed of two or more types, then $D_{(b)}$ 50 can be determined by weighting and averaging from the blending ratio according to the same method as with a cordierite forming raw material.

There is no particular restriction on a specific $D_{(a)}$ 50 of a cordierite forming raw material, but $D_{(a)}$ 50 is preferably, for example, 1 to 50 µm, more preferably 3 to 30 µm, and particularly preferably 3 to 26 µm. If $D_{(a)}$ 50 of a cordierite forming raw material is in the foregoing numerical range, then the filtration efficiency is advantageously improved.

The theoretical upper limit value of "$D_{(a)}$ 50/($D_{(a)}$ 90−$D_{(a)}$ 10)" of the left side in expression (1) is below 1.00. The substantial upper limit value of the left side in expression (1) is preferably, for example, 0.90 and more preferably 0.80.

There is no particular restriction on the lower limit value of "$|\log_{10} D_{(a)}$ 50−$\log_{10} D_{(b)}$ 50$|$" of the left side in expression (2). If "$\log_{10} D_{(a)}$ 50" and "$\log_{10} D_{(b)}$ 50" indicate the same value, then the value of the left side in expression (2) will be "0."

There is no particular restriction on the particle diameters of the porous silica and the fused silica. In the cumulative particle size distribution based on volume of the porous silica and the fused silica by the laser diffraction/scattering type particle size distribution measurement method, if the particle diameter (μm) of 50% by volume of the total volume from the small diameter side is denoted by $D_{(c)}$ 50, then the $D_{(c)}$ 50 of the porous silica and the fused silica is preferably 1 to 50 μm and more preferably 3 to 30 μm.

The cordierite forming raw material contains at least one of the porous silica and the fused silica as the inorganic pore formers described above preferably by 5 to 17 parts by mass and more preferably 8 to 15 parts by mass in 100 parts by mass of the cordierite forming raw material. If the content ratio of the inorganic pore former is below 5 parts by mass, then the effect of pore forming may become difficult to be exhibited, which is not desirable. If the content ratio of the inorganic pore former exceeds 17 parts by mass, then the thermal expansion coefficient of cordierite increases, which is not desirable in terms of thermal shock resistance. There is no particular restriction on the addition amount of an organic pore former, and the addition amount can be determined as appropriate according to the porosity or the like of the partition wall of a honeycomb filter to be manufactured. For example, the addition amount of an organic pore former is preferably 0.5 to 5 parts by mass and more preferably 1 to 4 parts by mass for 100 parts by mass of a cordierite forming raw material.

In the kneaded material preparation process, a dispersing medium is added to the cordierite forming raw material and the organic pore former, the particle sizes of which have been adjusted as described above, and then the mixture is blended and kneaded thereby to prepare the kneaded material. The dispersing medium may be, for example, water. When preparing the kneaded material, a binder, a surfactant and the like may be further added.

Examples of the binder include hydroxypropylmethyl cellulose, methyl cellulose, hydroxyethyl cellulose, carboxylmethyl cellulose, polyvinyl alcohol and the like. These may be used by one type alone, or may be used in combination of two or more types. As the surfactant, for example, dextrin, fatty acid soap, polyether polyol and the like can be used. These may be used alone or in combination of two or more.

There is no particular restriction on the method of preparing the kneaded material by blending and kneading a cordierite forming raw material and the like, and examples thereof include a method of blending and kneading by a kneader, a vacuum pugmill or the like.

(2-2) Forming Process

In the forming process, the kneaded material obtained in the kneaded material preparation process is formed into a honeycomb shape to manufacture a honeycomb formed body. There is no particular restriction on the forming method used for forming the kneaded material into a honeycomb shape, and examples thereof include conventionally known forming methods such as extrusion, injection molding, and press molding. Among these forming methods, a method of extruding the kneaded material prepared as described above by using a die corresponding to a desired cell shape, a partition wall thickness, and a cell density can be mentioned as a preferred example.

The honeycomb formed body obtained by the forming process is a pillar-shaped formed body that has a partition wall disposed to surround a plurality of cells that extend from the first end face to the second end face. The honeycomb formed body is fired so as to become the honeycomb structure body 4 in the honeycomb filter 100 shown in FIG. 1 to FIG. 3.

The obtained honeycomb formed body may be dried to obtain a honeycomb dried body from the honeycomb formed body. There is no particular restriction on the drying method, and examples thereof include hot air drying, microwave drying, dielectric drying, reduced-pressure drying, vacuum drying, and freeze drying, and among these, dielectric drying, microwave drying, and hot air drying are preferably performed alone or in combination.

In the forming process, the plugging portions are preferably formed by plugging the open ends of the cells of the honeycomb formed body. The plugging portions can be formed according to a conventional publicly known honeycomb filter manufacturing method. For example, as the method for forming the plugging portions, the following method can be mentioned. First, water and a binder or the like are added to a ceramic raw material to prepare a slurry plugging material. As the ceramic raw material, for example, the cordierite forming raw material or the like used to fabricate the honeycomb formed body can be used. Then, the plugging material is filled into the open ends of predetermined cells from the first end face side of the honeycomb formed body. When filling the plugging material into the open ends of the predetermined cells, preferably, for example, the first end face of the honeycomb formed body is provided with a mask to close the open ends of the remaining cells other than the predetermined cells, and the plugging material is selectively filled into the open ends of the predetermined cells. At this time, the slurry plugging material may be stored in a storage container, and the first end face side of the honeycomb formed body provided with the mask may be immersed in the storage container to fill the plugging material. Then, the plugging material is filled into the open ends of the remaining cells other than the predetermined cells from the second end face side of the honeycomb formed body. As the method for filling the plugging material, the same method as that for the predetermined cells described above can be used. The plugging portions may be formed before drying the honeycomb formed body or after drying the honeycomb formed body.

(2-3) Firing Process

The firing process is a process for firing the honeycomb formed body obtained in the forming process thereby to obtain a honeycomb filter. The temperature of a firing atmosphere for firing a honeycomb formed body is preferably, for example, 1300 to 1450° C., and more preferably 1400 to 1450° C. Further, the firing time is preferably set to 2 to 8 hours as the time for keeping a maximum temperature.

There is no particular restriction on the specific method of firing a honeycomb formed body, and a firing method in a conventional publicly known honeycomb filter manufacturing method can be applied. For example, the firing method can be implemented using an existing continuous firing furnace (e.g., tunnel kiln) or a batch firing furnace (e.g., shuttle kiln), which is provided with a charge port at one end and a discharge port at the other end of a firing path.

EXAMPLES

The following will describe in more detail the present invention by examples, but the present invention is not at all limited by the examples.

Example 1

For the cordierite forming raw material, talc, kaolin, alumina, aluminum hydroxide, and porous silica were prepared. Then, the cumulative particle size distribution of each raw material was measured using the laser diffraction/scattering type particle diameter distribution measurement device (trade name: LA-960) manufactured by HORIBA, Ltd. In Example 1, the raw materials were blended to prepare the cordierite forming raw materials such that the blending ratios (parts by mass) of the raw materials exhibited the values shown in Table 1. In Table 1, the horizontal row of "Particle size D50 (μm)" shows the particle diameter of 50% by volume (i.e., a median diameter) of each raw material. A porous silica having a BET specific surface area of 200 to 400 m²/g measured in accordance with JIS-R1626 was used.

Next, 3.5 parts by mass of a water absorbable polymer as an organic pore former, 6.0 parts by mass of a binder, 1 part by mass of a surfactant, and 86 parts by mass of water were added to 100 parts by mass of a cordierite forming raw material to prepare a kneaded material. As the water absorbable polymer, a polymer, the particle diameter of 50% by volume of which was 25 μm, was used. Table 2 shows the blending ratio (parts by mass) of the organic pore formers and other raw materials. In Table 2, the horizontal row of "Particle size D50 (μm)" shows the particle diameter (i.e., the median diameter) of 50% by volume of the organic pore formers. Further, the blending ratio (parts by mass) shown in Table 2 shows the ratio with respect to 100 parts by mass of the cordierite forming raw material.

TABLE 1

| | Blending ratio of cordierite forming raw material (parts by mass) | | | | | | | | | |
|---|---|---|---|---|---|---|---|---|---|---|
| | Talc | | Kaolin | Alumina | Aluminum hydroxide | Fused silica | | Porous silica | | |
| Particle size D50 (μm) | 10 | 20 | 5 | 6 | 1 | 3 | 25 | 20 | 26 | 30 |
| Example 1 | — | 40 | 11 | 26 | — | 5 | — | 18 | — | — |
| Example 2 | — | 40 | 11 | 26 | — | 5 | — | — | 18 | — |
| Example 3 | — | 40 | 11 | 26 | — | 5 | 18 | — | — | — |
| Example 4 | — | 40 | 11 | 26 | — | 5 | — | — | — | 18 |
| Comparative Example 1 | — | 40 | 16 | 10 | 22 | — | 12 | — | — | — |
| Comparative Example 2 | 40 | — | 19 | 14 | — | 15 | — | 12 | — | — |
| Comparative Example 3 | 40 | — | 19 | 14 | 15 | — | — | 12 | — | — |

TABLE 2

| | Blending ratio of organic pore former (parts by mass) | | Blending ratio of other raw materials (parts by mass) | | |
|---|---|---|---|---|---|
| Material | Foamable resin | Water absorbable polymer | Binder | Surfactant | Water |
| Particle size D50 (μm) | 45 | 25 | 30 | 50 | — |
| Example 1 | — | 3.5 | — | 6.0 | 1 | 86 |
| Example 2 | — | — | 3.5 | — | 6.0 | 1 | 83 |
| Example 3 | — | — | 3.5 | — | 6.0 | 1 | 66 |
| Example 4 | — | — | — | 3.5 | 6.0 | 1 | 86 |
| Comparative Example 1 | 9.0 | 0.5 | — | — | 6.0 | 1 | 26 |
| Comparative Example 2 | — | — | — | 4.0 | 6.0 | 1 | 86 |
| Comparative Example 3 | — | 3.0 | — | — | 6.0 | 1 | 82 |

Next, the obtained kneaded material was molded using a continuous extrusion molding machine to manufacture a honeycomb formed body. Next, plugging portions were formed on the obtained honeycomb formed body. First, a mask was applied to the first end face of the honeycomb formed body so as to close the open ends of the remaining cells other than the predetermined cells. Next, the masked end portion (the end portion on the first end face side) was immersed in a slurry plugging material to fill the open ends of the predetermined cells, which were not masked, with the plugging material. Thereafter, a mask was applied to the second end face of the honeycomb formed body so as to close the open ends of the predetermined cells, and the open ends of the remaining cells other than the predetermined cells were filled with the plugging material in the same manner as described above.

Next, the honeycomb formed body with the plugging portions formed therein was fired such that the maximum temperature was 1420° C., thereby manufacturing the honeycomb filter of Example 1.

The honeycomb filter of Example 1 had an end face diameter of 132 mm and a length of 102 mm in the extending direction of the cells. The cell shape in the cross section orthogonal to the extending direction of the cells was quadrangular. The partition wall thickness of the honeycomb filter was 0.25 mm, and the cell density was 46.5 cells/cm². Table 3 shows the partition wall thickness (mm) and the cell density (cells/cm²) of the honeycomb filter.

TABLE 3

| | | | | Value measured by laser microscope | | |
|---|---|---|---|---|---|---|
| | Partition wall thickness (mm) | Cell density (cells/cm²) | Porosity (%) | Average pore dia. (μm) | Average equivalent circle dia. (μm) | Number of pores (pores/mm²) |
| Example 1 | 0.25 | 46.5 | 65.3 | 20.0 | 19.9 | 584.1 |
| Example 2 | 0.25 | 46.5 | 63.8 | 24.1 | 21.1 | 481.5 |
| Example 3 | 0.25 | 46.5 | 61.3 | 24.0 | 25.3 | 431.2 |
| Example 4 | 0.25 | 46.5 | 66.4 | 30.0 | 28.3 | 403.7 |
| Comparative Example 1 | 0.30 | 35.7 | 65.2 | 20.9 | 12.0 | 620.0 |
| Comparative Example 2 | 0.25 | 46.5 | 64.5 | 24.3 | 19.9 | 394.1 |
| Comparative Example 3 | 0.25 | 46.5 | 62.6 | 15.5 | 13.7 | 571.3 |

On the honeycomb filter of Example 1, the porosity and the average pore diameter of the partition wall were measured. The results are shown in Table 3. The porosity and the average pore diameter were measured using Autopore IV (trade name) manufactured by Micromeritics. A part of the partition wall was cut out from the honeycomb filter to obtain a test piece, and the porosity was measured using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction. When determining the porosity and the average pore diameter, the true density of cordierite was set to 2.52 g/cm³.

On the honeycomb filter of Example 1, the number of pores (pores/mm²) which exist at the surface of the partition wall and which have equivalent circle diameters exceeding 3.0 μm, and the average equivalent circle diameter (μm) of the pores which exist at the surface of the partition wall and which have equivalent circle diameters exceeding 3.0 μm were measured. The measurement method is as described below. First, a sample for measurement was cut out from the honeycomb structure body such that the surface of the partition wall of the honeycomb structure body of the honeycomb filter of Example 1 could be observed. Then, the surface of the partition wall of the sample for measurement was photographed by a laser microscope. As the laser microscope, a shape analysis laser microscope of "VK X250/260 (trade name)" manufactured by KEYENCE Corporation was used. In the photographing of the surface of the partition wall, the magnification was set to 240 times, and arbitrary places of 10 fields of view were photographed. Image processing was performed on the captured image, and the number of pores in the surface of the partition wall and the surface open porosity were calculated. In the image processing, an area was selected so as not to include a partition wall portion other than the surface of the partition wall, and the inclination of the surface of the partition wall was corrected to horizontal. After that, the upper limit of the height for being recognized as pores was changed to −3.0 µm from the reference plane, and the number of pores and the surface open porosity of the captured image were calculated by image processing software under a condition that pores having equivalent circle diameters of 3.0 µm or less are ignored. The equivalent circle diameters (µm) of the pores of the surface of the partition wall were calculated by measuring an opening area S of each pore and applying an equation of the equivalent circle diameter=$\sqrt{\{4\times(\text{area S})/\pi\}}$ with respect to the area S that has been measured. The number of pores (pores/mm$^2$) of the surface of the partition wall and the value of the open porosity (%) of the surface of the partition wall were the average values of the measurement results of the 10 fields of view. As the image processing software, "VK-X (trade name)" included with the shape analysis laser microscope of "VK X250/260 (trade name)" manufactured by KEYENCE Corporation was used. The average equivalent circle diameter (µm) of the pores of the surface of the partition wall was determined as described below. First, in the captured image that has been subjected to the image processing, the equivalent circle diameter (µm) of each pore was calculated from the opening area S of each pore of the surface of the partition wall as described above. Then, for the pores having equivalent circle diameters exceeding 3.0 µm, the arithmetic mean value of the equivalent circle diameters (µm) was calculated, and the calculated value was used as the average equivalent circle diameter (µm) of the pores of the surface of the partition wall. The results are shown in Table 3. In Table 3, the column of "Number of pores (pores/mm$^2$)" shows the number per mm$^2$ of pores which exist at the surface of the partition wall and which have equivalent circle diameters exceeding 3.0 µm. Further, the column of "Average equivalent circle diameter (µm)" shows the average equivalent circle diameter (µm) of pores which exist at the surface of the partition wall and which have equivalent circle diameters exceeding 3.0 µm.

On the honeycomb filter of Example 1, the filtration efficiency and the pressure loss were evaluated according to the following method. In the evaluation of each of the filtration efficiency and the pressure loss, each honeycomb filter to be evaluated was loaded with a catalyst containing a platinum group element by the following method, and measurement was performed before and after the loading of the catalyst. In Table 4, the column of "Before loading of catalyst" shows the evaluation result of each honeycomb filter before the loading of the catalyst, and the column of "After loading of catalyst" shows the evaluation result of the honeycomb filter after the loading of the catalyst. The results are shown in Table 4.

(Catalyst Loading Method)

First, a catalyst slurry containing aluminum oxide having an average particle diameter of 30 µm was prepared. Then, using the prepared catalyst slurry, the honeycomb filter was loaded with the catalyst. To be specific, the loading of the catalyst was performed by dipping the honeycomb filter, then excess catalyst slurry was blown away by air so as to load the partition wall of the honeycomb filter with a predetermined amount of the catalyst. Thereafter, the honeycomb filter loaded with the catalyst was dried at a temperature of 100° C. and was further subjected to heat treatment at 500° C. for two hours so as to obtain a honeycomb filter with the catalyst. The loading amount of catalyst with which the honeycomb filter of Example 1 was loaded was 100 g/L.

(Filtration Efficiency)

First, exhaust gas purification devices were fabricated by using the honeycomb filters (or honeycomb filters with catalysts) of the examples and the comparative examples as the exhaust gas purifying filters. Then, each of the fabricated exhaust gas purification devices was connected to an outlet side of an engine exhaust manifold of a 1.2 L direct injection type gasoline engine vehicle, and the number of soot particles contained in the gas emitted from the outlet port of the exhaust gas purification device was measured by a PN measurement method. As for the driving mode, a driving mode (RTS95) that simulates the worst of RDE driving was implemented. The total number of soot particles emitted after the driving in the mode was taken as the number of soot particles of the exhaust gas purification device to be evaluated, and the filtration efficiency (%) was calculated from the number of soot particles. Further, the column of "Filtration efficiency ratio" of Table 4 shows the values of the filtration efficiency (%) of the exhaust gas purification device using the honeycomb filter with the catalyst of each of the examples and the comparative examples when the value of the filtration efficiency of the exhaust gas purification device using the honeycomb filter with the catalyst of Comparative Example 1 is defined as 100%. In the evaluation of the filtration efficiency, the honeycomb filter of each of the examples and the comparative examples was evaluated according to the following evaluation standard.

Evaluation "Excellent": If the value of the filtration efficiency ratio (%) exceeds 110%, then the evaluation is determined as "Excellent."

Evaluation "Good": If the value of the filtration efficiency ratio (%) is greater than 105% and equal to or less than 110%, then the evaluation is determined as "Good."

Evaluation "Acceptable": If the value of the filtration efficiency ratio (%) is greater than 100% and equal to or less than 105%, then the evaluation is determined as "Acceptable."

Evaluation "Fail": If the value of the filtration efficiency ratio (%) is equal to or less than 100%, then the evaluation is determined as "Fail."

(Pressure Loss)

The exhaust gas emitted from a 1.2 L direct injection type gasoline engine was introduced at a flow rate of 600 m$^3$/h at 700° C., and the pressures on the inflow end face side and the outflow end face side of each of the honeycomb filters (or the honeycomb filters with the catalyst) were measured. Then, the pressure loss (kPa) of each of the honeycomb filters was determined by calculating the pressure difference between the inflow end face side and the outflow end face side. The column of "Pressure loss ratio" of Table 4 shows the value of the pressure loss (%) of the honeycomb filter with the catalyst of each of the examples and the comparative examples when the value of the pressure loss of the honeycomb filter with the catalyst of Comparative Example 1 is defined as 100%. In the evaluation of the pressure loss, the honeycomb filter of each example was evaluated according to the following evaluation standard.

Evaluation "Excellent": If the value of the pressure loss ratio (%) is equal to or less than 90%, then the evaluation is determined as "Excellent."

Evaluation "Good": If the value of the pressure loss ratio (%) is greater than 90% and equal to or less than 95%, then the evaluation is determined as "Good."

Evaluation "Acceptable": If the value of the pressure loss ratio (%) is greater than 95% and equal to or less than 100%, then the evaluation is determined as "Acceptable."

Evaluation "Fail": If the value of the pressure loss ratio (%) exceeds 100%, then the evaluation is determined as "Fail."

On the honeycomb filters of Examples 2 to 4 and Comparative Examples 1 to 3, the filtration efficiency and the pressure loss were evaluated by the same method as that of Example 1. The results are shown in Table 4.

(Results)

The evaluation results of the filtration efficiency and the pressure loss of the honeycomb filters of Examples 1 to 4 were better than those of the honeycomb filters of Comparative Examples 1 and 2. Further, the honeycomb filter of Comparative Example 3 showed an excellent evaluation result in terms of the filtration efficiency, but showed a significantly poor evaluation result in terms of the pressure loss.

INDUSTRIAL APPLICABILITY

The honeycomb filter in accordance with the present invention can be used as a trapping filter for removing particulates and the like contained in exhaust gas.

TABLE 4

| | Evaluation of filtration efficiency | | | | Evaluation of pressure loss | | | |
|---|---|---|---|---|---|---|---|---|
| | Determination | Before loading of catalyst | After loading of catalyst | Filtration efficiency ratio | Determination | Before loading of catalyst (kPa) | After loading of catalyst (kPa) | Pressure loss ratio |
| Example 1 | Good | 66% | 73% | 110% | Good | 4.62 | 5.15 | 90% |
| Example 2 | Good | 64% | 72% | 109% | Good | 4.23 | 4.69 | 82% |
| Example 3 | Good | 62% | 70% | 106% | Excellent | 4.10 | 4.55 | 80% |
| Example 4 | Acceptable | 60% | 68% | 103% | Excellent | 4.04 | 4.48 | 79% |
| Comparative Example 1 | Reference | 66% | 66% | 100% | Reference | 4.96 | 5.70 | 100% |
| Comparative Example 2 | Fail | 60% | 62% | 94% | Good | 4.37 | 5.26 | 92% |
| Comparative Example 3 | Excellent | 75% | 78% | 118% | Fail | 5.19 | 6.12 | 107% |

Examples 2 to 4

In Examples 2 to 4, the blending ratios (parts by mass) of the raw materials used for the cordierite forming raw material were changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1.

Comparative Examples 1 to 3

In Comparative Examples 1 to 3, the blending ratios (parts by mass) of the raw materials used for the cordierite forming raw material were changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1. In Comparative Example 1, in addition to the water absorbable polymer as the organic pore former, a foamable resin having a particle size D50 of 45 μm was used as a pore former. In Table 2, the column of "organic pore former" shows the blending ratio (parts by mass) of the foamable resin as the pore former.

DESCRIPTION OF REFERENCE NUMERALS

1: partition wall; 2: cell; 2a: inflow cell; 2b: outflow cell; 3: circumferential wall; 4: honeycomb structure body; 5: plugging portion; 11: first end face; 12: second end face; and 100: honeycomb filter.

What is claimed is:

1. A honeycomb filter comprising:
a pillar-shaped honeycomb structure body having a porous partition wall disposed, surrounding a plurality of cells which serve as fluid through channels extending from a first end face to a second end face; and
a plugging portion provided at an open end on the first end face side or the second end face side of each of the cells,
wherein the partition wall is composed of a material containing cordierite as a main component thereof,
an average pore diameter of the partition wall is 20 to 30 μm,
an average equivalent circle diameter of pores which exist at a surface of the partition wall and which have equivalent circle diameters exceeding 3.0 μm is 19.9 to 28 μm, and
a number per unit area of pores which exist at a surface of the partition wall and which have equivalent circle diameters exceeding 3.0 μm is 400 per mm$^2$ or more and 584.1 per mm$^2$ or less.

2. The honeycomb filter according to claim 1, wherein a porosity of the partition wall is 60 to 70%.

3. The honeycomb filter according to claim 1, wherein a thickness of the partition wall is 152 to 305 μm.

4. The honeycomb filter according to claim 1, wherein the partition wall is loaded with a catalyst for purifying exhaust gas.

5. The honeycomb filter according to claim 1, wherein the average pore diameter of the partition wall is 22 to 28 μm.

* * * * *